Patented Dec. 4, 1923.

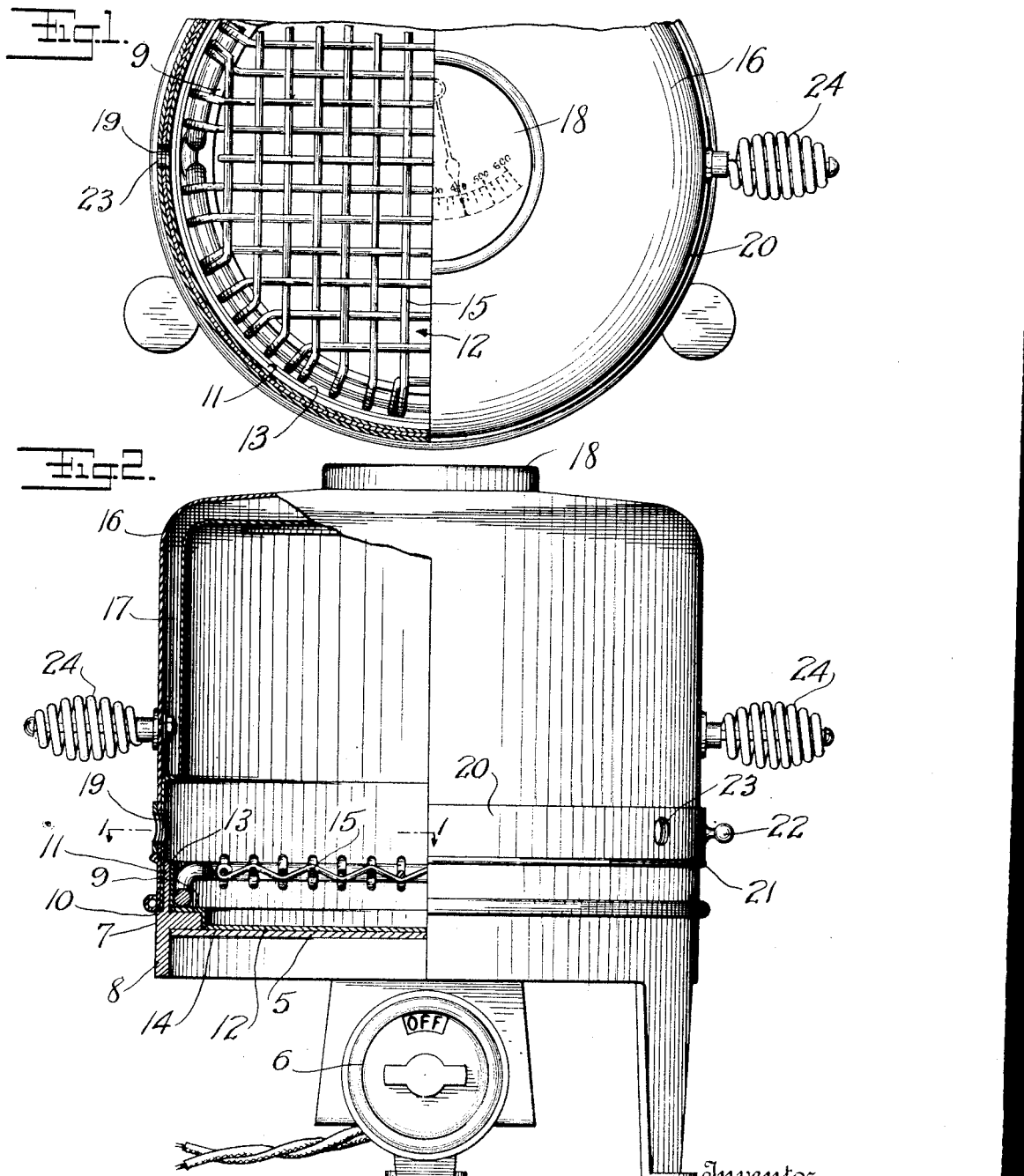

1,476,324

UNITED STATES PATENT OFFICE.

JOHN E. BURNS, OF FLUSHING, NEW YORK.

DENTAL CASTING FLASK HEATER AND INSTRUMENT STERILIZER.

Application filed October 26, 1920. Serial No. 419,631.

*To all whom it may concern:*

Be it known that I, JOHN EDWARD BURNS, a citizen of the United States, and a resident of Flushing, county of Queens, and State of New York, have invented certain new and useful Improvements in Dental Casting Flask Heaters and Instrument Sterilizers, of which the following is a specification.

My invention has for its objects the provision of simple, practical and relatively inexpensive apparatus for sterilizing dental and surgical instruments and for heating dental flasks and the like.

A special object is to provide for accurate control of the heating effect.

These and other objects I have attained by a novel construction, combination and arrangement of parts, as will be clear from the following specification, which is to be considered in connection with the accompanying drawing, wherein I have illustrated the invention embodied in a practical and preferred form.

Figure 1 in the drawing referred to is a part sectional and plan view of the apparatus, the sectional portion being taken on substantially the plane of line 1—1 of Figure 2.

Figure 2 is a side elevation and part vertical sectional view of the apparatus.

The heating element in the construction illustrated is an electrical hot plate 5 controlled and regulated by a switch 6. Attached to and carried by this hot plate is a supporting ring 7 having a dependent flange 8 embracing the rim of the plate and forming the means by which the ring is secured thereto.

This supporting ring has an internal annular shoulder 9 and is shown as having an external annular shoulder 10, said shoulders being disposed at opposite sides of an annular upstanding flange 11.

The internal shoulder 9 operates as a support for the pan 12, which is adapted to contain the water or sterilizing fluid, said pan having an annular upstanding rim or flange 13 in close-fitting heat conducting engagement with the upstanding rim 11 of the supporting ring. A plate 14 is shown interposed between the hot plate and the bottom of the supporting ring and pan 12 so as to maintain a good heat conducting relation between these parts.

Resting on the shouldered portion of the pan 12 is a grid 15 adapted to support the dental flask or the objects to be sterilized.

When the device is in use, the heat is confined by a hood or cover 16 whose lower edge is shaped to fit closely over the upstanding flange 11, and to rest on the external shoulder 10. This hood is preferably insulated thermally as by making it of double wall construction, as indicated at 17.

In order that the temperature within the heating chamber may be known, I have shown the hood as provided with an indicating thermometer 18 in the top thereof.

To permit regulation of the heat and to enable escape of vapors, I have shown the lower portion of the hood as having discharge openings 19 therein controlled by a damper ring 20 slidingly resting on the bead or annular shoulder 21, and adapted to be rotated as by means of a handle 22 to bring the openings 23 therein into register with the discharge openings 19.

The hood or cover is shown provided with diametrically oppositely arranged handles 24 which enable easy handling of the same and which provide hand-holds by which the hood may be held while adjusting the damper ring thereon.

The invention, it will be seen, is at once simple and practical. For sterilizing purposes, the dental instruments or other articles may be supported on the grid with a quantity of water beneath the same in the pan 12. The switch is turned to give the desired heat and the articles are allowed to remain for the necessary sterilizing period. The apparatus may be maintained at the sterilizing or other desired temperature by controlling the regulating switch and by means of the rotatable damper slide, the results being indicated at all times by the thermometer in the top of the cover.

The regulating switch 6, of commercial form, is arranged to produce different degrees of temperature in the hot plate, which makes it possible to approximate the desired temperature inside of the hood 16, which temperature may be regulated to a greater nicety by turning the damper ring a desired amount.

The apparatus, it will be seen, further provides an excellent oven for heating dental flasks and the like. In this use the pan is not necessary and may, if desired, be removed and the supporting grid be allowed to rest directly on the inner flange 9 of the supporting ring.

What I claim is:

1. In apparatus of the character described, a heating element, a supporting member carried thereby and provided with internal and external shoulders, a pan for engagement with the internal shoulder, and a cover for engagement with the external shoulder.

2. In apparatus of the character described, a heating element, a supporting member carried thereby and provided with internal and external shoulders, a pan for engagement with the internal shoulder, and a cover for engagement with the external shoulder, said supporting ring having an upstanding wall between the internal and external shoulders and the pan and cover aforesaid having close-fitting engagement with the opposite side surfaces of said wall.

3. In apparatus of the character described, a hot plate, a cover having a close-fitting engagement therewith and provided with one or more outlets in the side thereof, and a damper ring rotatably engaged on said cover over said outlet or outlets and provided with an opening or openings to register therewith.

4. In combination, a hot plate, a conducting plate thereon, a supporting ring resting on said conducting plate and having an annular flange engaging over the rim of the hot plate, said supporting ring having external and internal shoulders and an upstanding annular wall therebetween, a cover having a close-fitting engagement over the outer surface of the upstanding wall and adapted to rest with its lower edge bearing on the external shoulder, a pan resting on the internal shoulder having its bottom in engagement with the conducting plate and an annular rim in close-fitting engagement with the inner surface of the upstanding flange.

5. In combination, a hot plate, a cover having a close-fitting engagement therewith and provided with a thermometer in the top thereof and with an outlet or outlets in the side thereof, and a rotatably slidable damper engaged on the cover over said outlet or outlets.

6. In combination, a hot plate, a cover having a close-fitting engagement therewith and provided with a thermometer in the top thereof and with an outlet or outlets in the side thereof, and a rotatably slidable damper engaged on the cover over said outlet or outlets, said cover having an external bead for slidably supporting the damper.

7. In combination, a hot plate, a supporting ring having an annular flange around said hot plate, said supporting ring having external and internal shoulders, a cover constructed of two thicknesses of metal contacting with each other near the lower end of the cover and having a close-fitting engagement with the supporting ring, and a movable damper near said lower part of the cover, the remainder of said cover having the parts separated to form an insulating air space.

8. In combination, a hot plate, a supporting ring having an annular flange around said hot plate, said supporting ring having external and internal shoulders, a cover constructed of two thicknesses of metal contacting with each other near the lower end of the cover and having a close-fitting engagement with the supporting ring, a movable damper near said lower part of the cover, the remainder of said cover having the parts separated to form an insulating air space, and a thermometer in the upper part of said cover between the separated parts thereof.

In witness whereof, I hereunto set my hand this 21st day of October, 1920.

JOHN E. BURNS.